United States Patent [19]

Tsuge et al.

[11] Patent Number: 4,511,525

[45] Date of Patent: Apr. 16, 1985

[54] PROCESS FOR PRODUCING SINTERED SILICON NITRIDE-BASE BODY

[75] Inventors: Akihiko Tsuge; Michiyasu Komatsu, both of Yokohama; Hiroshi Inoue, Kawaguchi; Katsutoshi Komeya, Oiso, all of Japan

[73] Assignee: Tokyo Shibaura Denki Kabushiki Kaisha, Kawasaki, Japan

[21] Appl. No.: 443,678

[22] Filed: Nov. 22, 1982

[30] Foreign Application Priority Data

Nov. 26, 1981 [JP] Japan ................... 56-188455
Nov. 30, 1981 [JP] Japan ................... 56-192365

[51] Int. Cl.$^3$ .......................................... C04B 35/58
[52] U.S. Cl. ............................... 264/65; 501/97
[58] Field of Search .......................... 264/65; 501/97

[56] References Cited

U.S. PATENT DOCUMENTS

| | | | |
|---|---|---|---|
| 4,004,937 | 1/1977 | Masaki | 264/65 |
| 4,073,845 | 2/1978 | Buljan | 423/344 |
| 4,143,107 | 3/1979 | Ishii et al. | 264/65 |
| 4,179,301 | 12/1979 | Buljan | 106/73.5 |
| 4,284,432 | 8/1981 | Nishida et al. | 106/73.2 |
| 4,296,065 | 10/1981 | Ishii et al. | 264/332 |
| 4,327,187 | 4/1982 | Komatsu et al. | 501/97 |
| 4,356,136 | 10/1982 | Mangels | 501/97 |
| 4,376,742 | 3/1983 | Mah | 264/65 |

FOREIGN PATENT DOCUMENTS 0071997 6/1982 European Pat. Off. .

OTHER PUBLICATIONS

Ceramics, vol. 94, 1981, p. 299.
Ceramics, vol. 90, 1979, p. 309.
European Search Report, 82, 11, 0936.
Tsuge, A. et al., "Effect of Crystallization of the Grain Boundary Glass Phase on the High-Temperature Strength of Hot-Pressed $Si_3N_4$ Containing $Y_2O_3$, *Journal of the American Ceramic Society*, vol. 58, No. 7-8, 1975.

*Primary Examiner*—James Derrington
*Attorney, Agent, or Firm*—Schwartz, Jeffery, Schwaab, Mack, Blumenthal & Koch

[57] ABSTRACT

Disclosed is a process for producing a sintered silicon nitride-base body, which comprises; mixing powder (A) of heat-treated or not heat-treated silicon nitride powder and powder (B) of powder obtained by heat-treating a powdery mixture of silicon nitride powder and a sintering additive in a non-oxidizing atmosphere and then grinding the resulting heat-treated products into powder; and forming the resultant powdery mixture into a desired shape, which is then sintered in a non-oxidizing atmosphere.

The process is characterized by heating powder (B), or powder (A) and powder (B), before sintering, thereby producing sintered silicon nitride body of highly improved properties.

7 Claims, No Drawings

PROCESS FOR PRODUCING SINTERED SILICON NITRIDE-BASE BODY

BACKGROUND OF THE INVENTION

This invention relates to a process for producing a sintered silicon nitride-base body, and more particularly, to a production process of a sintered silicon nitride-base body having high homogeneity or excellent mechanical strength at high temperatures (hereinafter called "high-temperature strength").

Sintered ceramic bodies made principally of silicon nitride have been attracting in recent years engineers' attention as a variety of industrial machine elements and parts owing to their excellent resistance to heat, corrosion, wear, abrasion, etc. Reflecting such an increased demand for sintered silicon nitride-base bodies, a number of researches have been carried out. As a result, various ceramic materials have been proposed, together with their compositions and production processes. Despite the excellent characteristics of sintered ceramic bodies, actual usable products have however been available only in a very limited field. Moreover, even in such a very limited field where ceramics are actually used, they are used, for example, within the temperature range of from ambient temperature to several hundred degrees or so and under static load. Thus, the excellent characteristics of ceramics have not been fully utilized. Various reasons may be contemplated as causes for such a limited application of ceramics. The main reason, however, seems to reside in their poor reliability when used as industrial materials because their inherent physical, chemical and mechanical characteristics are poor in homogeneity and their high-temperature strength is not always satisfactory.

SUMMARY OF THE INVENTION

An object of this invention is to provide a production process of a sintered silicon nitride-base body which has a high degree of homogeneity in various characteristics pertaining to ceramics, shows excellent mechanical strength at high temperatures and is highly reliable as an industrial material.

The present inventors have carried out intensive research. As a result, it has been found that the cause for the lowered high-temperature strength of a sintered body resides in a glassy (amorphous) grain-boundary phase of a low melting point formed by a reaction between silica ($SiO_2$) contained in the raw material for the sintered body and a sintering aid or additive. It has also been uncovered that the above-described object of this invention can be achieved by completely or substantially removing silica from the raw material for the sintered body in accordance with a heat treatment, leading to the completion of this invention.

Accordingly, the present invention provides a process for producing a sintered silicon nitride-base body, which process comprises:

mixing (A) silicon nitride powder and (B) powder obtained by heat-treating a powdery mixture of silicon nitride powder and a sintering additive in a non-oxidizing atmosphere and then grinding the resulting heat-treated products into powder (hereinafter the former (A) is often referred to as "powder (A)" and the latter (B) as "powder (B)"); and forming the resultant powdery mixture into a desired shape, which is then sintered in a non-oxidizing atmosphere. The present invention will hereinafter be described further in detail.

DETAILED DESCRIPTION OF PREFERRED EMBODIMENTS

The above-described powder (A) may be either silicon nitride powder which has beforehand been heat-treated or silicon nitride powder which has not been subjected to such a heat treatment. Heat-treated silicon nitride powder may be prepared under the following conditions. Namely, it is preferred to conduct the heat treatment in a non-oxidizing atmosphere and within the temperature range of 1450° to 1800° C. More preferable temperature range is 1500° to 1700° C. If the temperature of the heat treatment should exceed 1800° C., the particle size of silicon nitride powder may become coarser and/or silicon nitride may be converted to silicon carbide and the like under the influence of impurities such as carbon present in the heat-treatment system. On the other hand, any heat treatment temperatures lower than 1450° C. may reduce the effects of the heat treatment because of lowered vaporization velocity of $SiO_2$.

In addition, the powder (B) composed of silicon nitride and the sintering additive and useful in the practice of this invention may be prepared under the following conditions. Namely, after milling desired amounts of silicon nitride powder and sintering additive in, for example, a ball mill or the like, a heat treatment is applied to the resultant powder mixture in a non-oxidizing atmosphere. It is preferred to apply such a heat treatment at temperatures in the range of 1450° to 1750° C., and more preferably 1500° to 1700° C. The temperature of such a heat treatment may vary depending on the composition of each powder mixture to be heat-treated. Practically speaking, the heat treatment may be effected at any temperature and for any time period so long as they are high and long enough to form crystalline and/or glassy substances or reaction products of such substances with silicon which make up a grain-boundary phase in an ordinary sintered silicon nitride-base body. Thereafter, the thus heat-treated mixture is ground to a particle size of preferably 2 $\mu$m or smaller, and more preferably 1 $\mu$m or smaller using a conventional milling machine such as ball mill, pot mill or the like.

Next, the thus-obtained two types of powdery raw materials, powder (A) and power (B), in which the $SiO_2$ concentrations have been lowered are mixed in desired proportions, optionally followed by an addition of another sintering additive for improving the homogeneity. The resulting powder mixture is formed into a desired shape, which is then sintered in a non-oxidizing atmosphere. The sintering may be effected, for example, at temperatures of 1750° to 1800° C. until the densification treatment has been achieved to a sufficient extent.

As exemplary non-oxidizing atmospheres useful in the practice of this invention, may be mentioned $N_2$, CO, Ar, $NH_3$ and $H_2$ atmospheres. It is preferable to choose a suitable non-oxidizing atmosphere in accordance with each material to be subjected to the heat treatment.

The silicon nitride powder used in the present invention may be of either $\alpha$-type crystalline structure of $\beta$-type crystalline structure. The effects of this invention will not be damaged by the difference in the type of crystalline structure.

Any sintering additives may be used in the present invention so long as they contribute to the acceleration of sintering. Exemplary sintering additives include MgO, Al$_2$O$_3$, Y$_2$O$_3$, SiO$_2$, TiO$_2$, ZrO$_2$, Li$_2$O, CaO, BeO, V$_2$O$_5$, MnO$_2$, MoO$_3$, WO$_3$, Cr$_2$O$_3$, NiO, Nb$_2$O$_5$, Ta$_2$O$_5$, HfO$_2$ and the oxides of other rare earth elements as well as a variety of nitrides and carbides such as AlN, TiN and SiC. They may be used singularly or in combination.

The composition of the powder (B) composed of silicon nitride powder and a powdery sintering additive, both heat-treated, and useful in the practice of this invention may be preferably composed of 20 to 100 wt.% (exclusive of 100 wt.%) of the powdery sintering additive and the balance of silicon nitride powder. More preferably, the powder (B) is composed of 40 to 60 wt.% of the powdery sintering additive and the balance of silicon nitride powder. If the sintering additive should be incorporated in any amounts lower than 10 wt.%, the densification of each sintered body cannot be achieved to a satisfactory extent unless significant amounts of the sintering additive is additionally incorporated upon effecting the sintering step. However, a subsequent addition of such a sintering additive in a high proportion deteriorates the strength of resulting sintered body and is thus undesirable.

It is preferable to mix the heat-treated or not heat-treated silicon nitride powder (A) and the powder (B) in such a proportion that the resultant sintered body may contain 75 to less than 100 wt.%, more preferably, 85 to 95 wt.%, of silicon nitride of the powder (A).

In the above-described powder (B), the reaction mixture of silicon nitride and the sintering additive is presumed to have such a structure as will be described below. Namely, assuming that the sintering additive is represented by "Me-O-N-C" (in which Me means a metallic element), a system of one or more of Me-O-N-C compounds undergoes a phase reaction at 1450° to 1750° C., thereby converted to a crystalline and/or glassy substances. An addition of silicon nitride is considered to form a reaction product which is represented by "Si-Me-O-N(C)" in which Me means a metallic element and N(C) indicates that a part of N has been substituted by C. Such Si$_3$N$_4$-"Me-O-N-C"-type compounds have extremely similar compositions to the grain-boundary phases of their sintered products. By allowing such a reaction product to be present in a compact of a desired shape prior to its sintering, the reaction in the sintering step can be simplified and, corollary of this, a sintered body having high homogeneity is considered to come out.

In the present invention, the powder (A) may be either heat-treated silicon nitride powder or not heat-treated silicon nitride powder. When heat-treated silicon nitride powder is used, it is possible to produce a sintered body having excellent strength at elevated temperatures.

The present invention will be described further in detail in the following examples and comparative examples.

EXAMPLE 1

A powdery mixture consisting of 50 wt.% of silicon nitride powder, 30 wt.% of Y$_2$O$_3$ powder and 20 wt.% of Al$_2$O$_3$ powder was heat-treated at 1500° C., for 2 hours and in a nitrogen gas atmosphere. The resulting agglomerates were comminuted to the average particle size of 1μ in a ball mill, thereby obtaining a powdery reactant, powder (B). A powdery mixture consisting of 20 wt.% of the thus-obtained powdery reactant and the remainder of silicon nitride powder, powder (A), was molded under the forming pressure of 1 ton/cm$^2$ into a plate of 30 mm×30 mm×10 mm. Five plates were prepared in total, which were then sintered at 1750° C., for 1 hour and in a nitrogen gas atmosphere.

COMPARATIVE EXAMPLE 1

Following the same procedure as in Example 1 except that the first-mentioned powdery mixture was employed as powder (B) without the heat treatment, the same number of plate-like sintered bodies of the same dimensions were prepared.

Test 1

Rectangular bars of 3 mm×3 mm×25 mm were cut from each of the sintered products of Example 1 and Comparative Example 1. Their surfaces were polished by a 400-grit diamond wheel. Their strength were determined respectively at ambient temperature (25° C.) and 1300° C. by the three-point loading method. The measurement of the strength was effected using fifty (50) test bars for each lot. The distribution of data was analyzed in accordance with the Weible's statistical data processing method so as to evaluate the homogeneity of each sintered product. Incidentally, the distribution of the strength constitutes a Weible's probability distribution function of rupture, which is expressed by the following equation:

$$F(\sigma) = 1 - exP\{-(\sigma/\sigma_o)^m\}$$

in which
 F($\sigma$): probability distribution function of rupture at strength value $\sigma$;
 $\sigma_o$: constant; and
 m: Weible's constant.

The greater the m, a variable in Weible's probability distribution function of rupture, the smaller the strength distribution. The smaller the m, the greater the strength distribution.

Results of Example 1 and Comparative Example 1 are summarized in Tables 1 and 1a which will appear later. For example, when the heat treatment was applied, the average strength in the test under ambient temperature was 85 kg/mm$^2$ and the strength data scattered little (m=17). On the other hand, when no heat treatment was applied, the average strength was 80 kg/mm$^2$ and the strength data scattered significantly (m=12). Therefore, it has been confirmed that the heat treatment, which constitutes the principal feature of this invention, is effective for the improvement of the homogeneity, namely, the reliability of each sintered product.

EXAMPLES 2–10

Sintered products were respectively prepared using the compositions and the heat treatment and sintering conditions shown in Table 1. Using fifty (50) test bars per each sintered product, its three-point loading strength was determined respectively at ambient temperature (25° C.) and 1300° C. similar to Test 1 and its Weible's constant m was determined. Results are shown in Table 1a.

COMPARATIVE EXAMPLES 2–10

Employing compositions and heat treatment and sintering conditions respectively corresponding to those of Examples 2–10, sintered bodies were prepared under the same conditions except that powder (B) had not been subjected to the heat treatment. Following the procedure of Test 1, the three-point strength of each of the sintered products was measured respectively at ambient temperature (25° C.) and 1300° C. and its Weible's constant was then determined. Results are also given in Table 1a.

provision of a powdery mixture (B) of the average particle size of 1μ.

Using a powdery raw material mixture for sintered bodies which mixture consisted of 80 wt.% of heat-treated $Si_3N_4$ powder (A) and the balance of the powdery mixture (B) obtained by the above treatments, five plate-like compacts of 30 mm×30 mm×10 mm were formed under the forming pressure of 1 ton/cm² and then sintered at 1750° C., for 1 hour and in an $N_2$-gas atmosphere, thereby obtaining plate-like sintered products.

Similar to Test 1, the three-point loading strength ($\sigma$) at ambient temperature (25° C.) and 1300° C., respectively, and the Weible's constant (m), which is an index showing the distribution of the strength data, were determined with respect to the sintered product of Example 11.

Results are tabulated as Tables 2 and 2a, which will appear later.

TABLE 1

| Example No. | Powder (A) Composition | Powder (B) Composition of sintering additive | $Si_3N_4$ (wt. %) | Conditions of heat treatment Temp. (°C.) | Time (hr) | Conditions of sintering Temp. (°C.) | Time (hr) |
|---|---|---|---|---|---|---|---|
| 1 | $Si_3N_4$ | $6Y_2O_3$—$4Al_2O_3$ | 50 | 1500 | 2 | 1750 | 1 |
| 2 | " | $5Y_2O_3$—$5Al_2O_3$—$3AlN$—$2TiO_2$ | 50 | 1600 | 1 | 1750 | 2 |
| 3 | " | $5Y_2O_3$—$5Al_2O_3$—$3AlN$—$2MgO$ | 30 | 1500 | 1 | 1750 | 2 |
| 4 | " | $5Al_2O_3$—$5MgO$—$2SiO_2$ | 75 | 1500 | 2 | 1700 | 2 |
| 5 | " | $5Al_2O_3$—$5ZrO_2$—$2TiO_2$ | 80 | 1650 | 1 | 1750 | 2 |
| 6 | " | $3Y_2O_3$—$4Al_2O_3$—$1SiC$ | 30 | 1600 | 1 | 1750 | 2 |
| 7 | " | $2Y_2O_3$—$2AlN$—$1Cr_2O_3$—$1TiO_2$—$1MnO_2$—$1MoO_3$ | 50 | 1700 | 0.5 | 1750 | 2 |
| 8 | " | $5Y_2O_3$—$5Al_2O_3$—$3AlN$—$1TiN$ | 80 | 1700 | 0.5 | 1780 | 2 |
| 9 | " | $5Sm_2O_3$—$2AlN$—$2SiO_2$ | 10 | 1650 | 1 | 1750 | 2 |
| 10 | " | $5Y_2O_3$—$2Al_2O_3$—$0.5TiO_2$—$0.5ZrO_2$—$0.5BeO$—$0.5Nb_2O_3$—$0.5HfO_2$ | 5 | 1700 | 1 | 1780 | 4 | powder (A):powder (B) = 80:20 (wt. %)

TABLE 1a

| | Test results at ambient temp. | | | | Test results at 1300° C. | | | |
|---|---|---|---|---|---|---|---|---|
| | Example | | Comparative Example (no heat treatment) | | Example | | Comparative Example (no heat treatment) | |
| No. | Strength (kg/mm²) | m | Strength (kg/mm²) | m | Strength (kg/mm²) | m | Strength (kg/mm²) | m |
| 1 | 85 | 17 | 80 | 12 | 43 | 19 | 40 | 13 |
| 2 | 89 | 18 | 80 | 10 | 40 | 19 | 34 | 15 |
| 3 | 85 | 16 | 78 | 11 | 38 | 19 | 29 | 17 |
| 4 | 75 | 17 | 70 | 10 | 35 | 20 | 29 | 16 |
| 5 | 68 | 15 | 60 | 9 | 30 | 20 | 28 | 14 |
| 6 | 80 | 17 | 59 | 8 | 30 | 20 | 20 | 14 |
| 7 | 70 | 19 | 61 | 10 | 40 | 20 | 23 | 13 |
| 8 | 75 | 16 | 55 | 8 | 35 | 21 | 25 | 15 |
| 9 | 65 | 19 | 58 | 10 | 35 | 20 | 30 | 16 |
| 10 | 70 | 16 | 50 | 9 | 29 | 23 | 25 | 16 |

EXAMPLE 11

Two hundred grams (200 g) of silicon nitride powder containing 95 wt.% of α-type $Si_3N_4$ were placed in a container made of aluminum nitride and subjected to a heat treatment at 1600° C., for 1.5 hours and in an $N_2$-atmosphere, thereby obtaining heat-treated $Si_3N_4$ powder, powder (A).

Then, a powdery mixture consisting of 50 wt.% of silicon nitride powder, 30 wt.% of yttrium oxide powder and 20 wt.% of aluminum oxide powder was subjected to a heat treatment at 1500° C., for 2 hours and in an $N_2$-atmosphere. Thereafter, the resultant agglomerates were comminuted in a ball mill, leading to the

EXAMPLES 12-21

Sintered products were prepared, respectively using the compositions and the heat treatment and sintering conditions shown in Table 2. Similar to Test 1, fifty (50) test bars per each sintered product were employed and their three-point loading strengths were measured respectively at ambient temperature (25° C.) and 1300° C. The Weible's constant was then determined. Results are shown in Table 2a.

TABLE 2

| | Powder (A) | | | Powder (B) | | | Conditions of heat treatment | | Conditions of sintering | |
|---|---|---|---|---|---|---|---|---|---|---|
| | Conditions of heat treatment of $Si_3N_4$ | | | Composition | | | | | | |
| | Atmosphere | Temp. (°C.) | Time (hr) | $Si_3N_4$ (wt. %) | Sintering additive Composition | (wt. %) | Temp. (°C.) | Time (hr) | Temp. (°C.) | Time (hr) |
| Example 11 | $N_2$ | 1600 | 1.5 | 50 | $6Y_2O_3 4Al_2O_3$ | 50 | 1500 | 2 | 1750 | 1 |
| Example 12 | $N_2$ | 1650 | 2 | 50 | $5Y_2O_3—5Al_2O_3—3AlN—2TiO_2$ | 50 | 1600 | 1 | 1750 | 2 |
| Example 13 | Ar | 1650 | 1 | 30 | $5Y_2O_3—5Al_2O_3—3AlN—2MgO$ | 70 | 1500 | 1 | 1750 | 2 |
| Example 14 | $N_2$ | 1450 | 3 | 75 | $5Al_2O_3—5MgO—2SiO_2$ | 25 | 1500 | 2 | 1700 | 2 |
| Example 15 | Ar | 1600 | 1 | 80 | $5Al_2O_3—5ZrO_2—2TiO_2$ | 20 | 1650 | 1 | 1750 | 2 |
| Example 16 | $N_2$ | 1800 | 1 | 30 | $3Y_2O_3—4Al_2O_3—SiC$ | 70 | 1600 | 1 | 1750 | 2 |
| Example 17 | $N_2$ | 1500 | 2 | 50 | $2Y_2O_3—2AlN—Cr_2O_3—TiO_2—MnO_2—MoO_3$ | 50 | 1700 | 0.5 | 1750 | 2 |
| Example 18 | Ar | 1700 | 1 | 80 | $5Y_2O_3—5Al_2O_3—3AlN—TiN$ | 20 | 1700 | 0.5 | 1780 | 2 |
| Example 19 | $NH_3 + H_2$ | 1500 | 2 | 10 | $5Sm_2O_3—2AlN—2SiO_2$ | 90 | 1650 | 1 | 1750 | 2 |
| Example 20 | $N_2 + Ar$ | 1600 | 1 | 5 | $5Y_2O_3—2Al_2O_3—0.5TiO_2—0.5ZrO_2—0.5BeO—0.5Nb_2O_5—0.5HfO_2$ | 95 | 1700 | 1 | 1780 | 4 | powder (A):powder (B) = 80:20 (wt. %)

TABLE 2a

| Example No. | Test results at ambient temp. | | Test results at 1300° C. | |
|---|---|---|---|---|
| | Strength (kg/mm²) | m | Strength (kg/mm²) | m |
| 11 | 88 | 18 | 80 | 19 |
| 12 | 90 | 19 | 72 | 20 |
| 13 | 85 | 19 | 69 | 19 |
| 14 | 78 | 17 | 65 | 21 |
| 15 | 75 | 15 | 69 | 20 |
| 16 | 83 | 19 | 65 | 20 |
| 17 | 70 | 18 | 70 | 19 |
| 18 | 79 | 17 | 60 | 22 |
| 19 | 70 | 19 | 70 | 23 |
| 20 | 69 | 17 | 65 | 20 |

As apparent from the above examples and comparative examples, it has been confirmed that all the sintered products prepared in accordance with the process of this invention show strength values of not less than 60 kg/mm² and have Weible's constants of 19 or greater at high temperature, in other words, has high homogeneity, and were thus far superior to those obtained using powdery raw materials which had not been subjected to any heat treatment.

We claim:

1. A process for producing a sintered silicon nitride-base body, comprising the steps of:

producing a powdery mixture (B) comprising silicon nitride and a sintering additive;

heat treating said powdery mixture (B) at a temperature ranging from about 1450° to 1750° C. in a non-oxidizing atmosphere;

grinding said heat-treated mixture into a powder;

heat treating a powder (A) consisting essentially of silicon nitride at a temperature ranging from about 1450° to 1800° C. in a non-oxidizing atmosphere;

mixing said heat-treated powdery mixture (B) and said heat-treated powder (A) to form a product powdery mixture;

forming said product powdery mixture into a desired shape; and sintering said formed product powdery mixture in a non-oxidizing atmosphere.

2. The process as claimed in claim 1, wherein the heat-treatment was effected at temperatures of 1500° to 1700° C.

3. The process as claimed in claim 1, wherein the powder (B) comprises 20 to less than 100 wt.% of the sintering additive and the balance of silicon nitride powder.

4. The process as claimed in claim 3, wherein the powder (B) consists of 40 to 60 wt.% of the sintering additive and the balance of silicon nitride powder.

5. The process as claimed in claim 1, wherein the sintering additive comprises one or more compounds selected from the group consisting of MgO, $Al_2O_3$, $Y_2O_3$, $SiO_2$, $TiO_2$, $ZrO_2$, $Li_2O$, CaO, BeO, $V_2O_5$, $MnO_2$, $MoO_3$, $WO_3$, $Cr_2O_3$, NiO, $Nb_2O_5$, $Ta_2O_5$, $HfO_2$, oxides of other rare earth elements, AlN, TiN and SiC.

6. The process as claimed in claim 1, wherein the powder (A) is used in a proportion of 75 to less than 100 wt.% and the balance is the powder (B).

7. The process as claimed in claim 1, wherein the powder (A) is heat-treated at temperatures of 1500° to 1700° C.

* * * * *